United States Patent [19]

Jassby et al.

[11] 4,338,820

[45] Jul. 13, 1982

[54] METHOD AND APPARATUS FOR GENERATING AND DETECTING ACOUSTIC SURFACE WAVES PARTICULARLY USEFUL IN THE NON-DESTRUCTIVE TESTING OF MATERIALS

[75] Inventors: Kenneth Jassby; Aaron Zeiger, both of Herzlia, Israel

[73] Assignee: Ramot University Authority for Applied Research & Industrial Development, Tel Aviv, Israel

[21] Appl. No.: 190,616

[22] Filed: Sep. 25, 1980

[51] Int. Cl.$^3$ .......... G01N 29/00

[52] U.S. Cl. .......... 73/597; 73/644; 310/313 R

[58] Field of Search .......... 73/597, 598, 644, 599, 73/600; 310/313 R

[56] References Cited

U.S. PATENT DOCUMENTS

| | | | |
|---|---|---|---|
| 3,340,953 | 9/1967 | Zemanek, Jr. | 73/597 X |
| 3,580,057 | 5/1971 | Seegmiller | 73/597 |
| 4,059,989 | 11/1977 | Halsey | 73/598 |

FOREIGN PATENT DOCUMENTS

| | | | |
|---|---|---|---|
| 538285 | 1/1977 | U.S.S.R. | 73/599 |

OTHER PUBLICATIONS

Gordon, Jr.–Measurement of Applied and Residual Stresses Using an Ultrasonic Instrumentation System–ISA Transactions, vol. 19, No. 2, 1980, pp. 33–41.

*Primary Examiner*—Charles A. Ruehl
*Attorney, Agent, or Firm*—Benjamin J. Barish

[57] ABSTRACT

A method and apparatus for generating and detecting acoustic surface waves particularly useful in the non-destructive testing of materials. In this method, the acoustic surface wave is generated in the test sample by a generator transducer coupled to the test sample so as to cause the acoustic wave to impinge on it at the required critical angle. The acoustic surface wave is detected by a pair of spaced steel wedges having their narrow ends in contact with the surface of the test sample so as to detect the shear component of the acoustic surface wave and to generate bulk waves in the steel wedges which travel away from the plane of the contact surface to pick-up transducers. In one described embodiment, the steel wedges provide two spaced, rounded-surface, long-line contacts with the test sample; and in a second described embodiment, a three-member contact is provided in which two of the members are defined by rounded-surface short-line contacts of the wedges, and a third, stabilizing contact is provided by a ball.

21 Claims, 5 Drawing Figures

METHOD AND APPARATUS FOR GENERATING AND DETECTING ACOUSTIC SURFACE WAVES PARTICULARLY USEFUL IN THE NON-DESTRUCTIVE TESTING OF MATERIALS

BACKGROUND OF THE INVENTION

The present invention relates to a method of generating and detecting acoustic surface waves in a material, which method is particularly useful in the non-destructive testing of the material by measuring the velocity of an acoustic surface wave therethrough. The invention also relates to apparatus, and particularly to a novel probe, useful in such method.

Acoustic surface waves are employed as an investigative tool in several aspects of non-destructive testing of materials, particularly metals, which tests include the measurement of surface wave attenuation coefficients, reflection coefficients, and velocity. For example, the onset of fatigue or stress corrosion failure is accompanied by microstructural changes in the material under consideration, and these have been correlated with shifts in the attenuation of acoustic surface waves. In addition, empirical relations have been determined relating attenuation coefficient to grain size in various materials. Surface waves have been used to detect and measure surface-breaking cracks through partial reflection of the propagating waves. Directional dependence of surface wave velocity has been attributed to the presence of preferred grain orientation. It has also been shown that surface wave velocity changes of the order of a fraction of one percent are induced by internal surface stresses, this latter interaction being termed the "acousto-elastic" effect.

Acoustic wave attenuation changes and variations in wave velocity that result from the various effects described above are in most cases small perturbations only. In order to determine meaningful correlations between attenuation or velocity and the various independent variables, detection and monitoring equipment with a high degree of repeatability and resolution is required. In addition, during the course of measurement this instrumentation must not change surface properties of the material being examined.

The most common method, known as the "critical angle" technique, for generating and detecting surface waves on a test sample surface employs plastic wedges and is based on Snell's Law. In this technique a compression wave, generated in the plastic wedge by a transducer, impinges on the test sample surface at the "critical angle" required for the generation of a surface wave therealong. The surface wave may be detected by the reverse process. Oil or some other fluid is usually used as a coupling medium between the plastic wedge and test sample surface to ensure passage of the various waves.

A second known, but less commonly applied, method for generation of surface waves, which may be termed the "driven wedge" technique, is based on the fact that a sharp metal wedge driven vertically into a test sample surface will generate surface waves in two opposing directions along the test sample surface. The driving force may be a compression wave generated by a transducer mounted at the top end of the wedge and travelling in the direction of the sharp edge of the wedge. A travelling surface wave may be detected by an identical wedge in contact with the surface, as the shear component of the wave couples to the wedge, thereby generating a bulk wave which travels in the wedge away from the contact plane and in the direction of the transducer.

Both of the above techniques have been adapted to the development of surface wave devices including generating wedges and similar detecting wedges. However, we have found that these known devices using similar generating and detecting wedges have a number of serious drawbacks which substantially reduce their feasibility, or even preclude their use, in many non-destructive testing applications, particularly for the measurement of surface wave velocity changes as a function of externally applied stresses. For example, it was found that in the "critical angle" technique, the high temperature sensitivity of acoustic velocity in plastic is such that very small temperature fluctuations (of 0.1° C.) create such variations in the acoustic velocity as to substantially mask the variations therein caused by the stresses to be measured. With respect to the "driven wedge" technique, it was found that the generated acoustic wave is not focused, and therefore much of the initial intensity of the waves generated by the generator wedge is lost through reflections from the sides of the wedge as the wave travels towards its narrow edge, thereby producing an output having a low signal-to-noise ratio.

An object of the present invention is to provide an improved method and apparatus for generating and detecting an acoustic surface wave particularly useful for the non-destructive testing of materials, which method and apparatus have advantages in the above respects.

SUMMARY OF THE INVENTION

According to the present invention, there is provided a method and apparatus for generating and detecting an acoustic surface wave particularly useful in the non-destructive testing of materials by measuring the velocity of an acoustic surface wave through a test sample. The method and apparatus are broadly characterized in that: (a) the acoustic surface wave is generated by a generator transducer coupled to the test sample such as to cause an acoustic wave generated by the transducer to impinge on the test sample surface at the critical angle required for the generation of an acoustic surface wave therealong; and (b) the acoustic surface wave is detected by detector means including at least one pick-up transducer coupled to the surface of the test sample by a wedge-shaped coupling device having its narrow end in contact with the surface of the test sample, and its longitudinal axis perpendicular thereto, such that the narrow end detects the shear component of the acoustic surface wave and generates a bulk wave which travels longitudinally through the coupling device, away from its narrow end, to the pick-up transducer.

It has been found that the above method for generating and detecting the acoustic surface wave produces a much higher degree of sensitivity and repeatability than either of the previously-known techniques briefly described above.

Particularly good results have been produced when the acoustic surface wave is detected by two pick-up transducers each coupled to one of the wedge-shaped pick-up coupling devices, the latter being spaced from each other a predetermined distance in the direction of travel of the acoustic surface wave.

The pick-up contact surface, in the direction of travel of the surface wave, should be smaller than the wave-length of the acoustic surface wave, but large enough so as to pick up sufficient energy of the shear component of the acoustic surface wave to generate the bulk wave in the wedge which travels away from the plane of the contact surface to the pick-up transducer. For example, a pick-up contact surface radius of about 0.2 mm has been found particularly effective with respect to wavelengths of about 0.6 mm.

The invention also provides apparatus, particularly a novel probe, useful in the above method of generating and detecting acoustic surface waves.

Two embodiments of the invention are described below. In one described embodiment, each of the wedge-shaped pick-up coupling devices produces a long-line contact with the test material. However, a second embodiment is described in which each of the pick-up coupling devices produces a substantially short-line contact with the test material, the latter embodiment including a third, stabilizing essentially point contact with the surface of the test material, this arrangement having been found to even further increase the sensitivity and repeatability of the method and apparatus.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
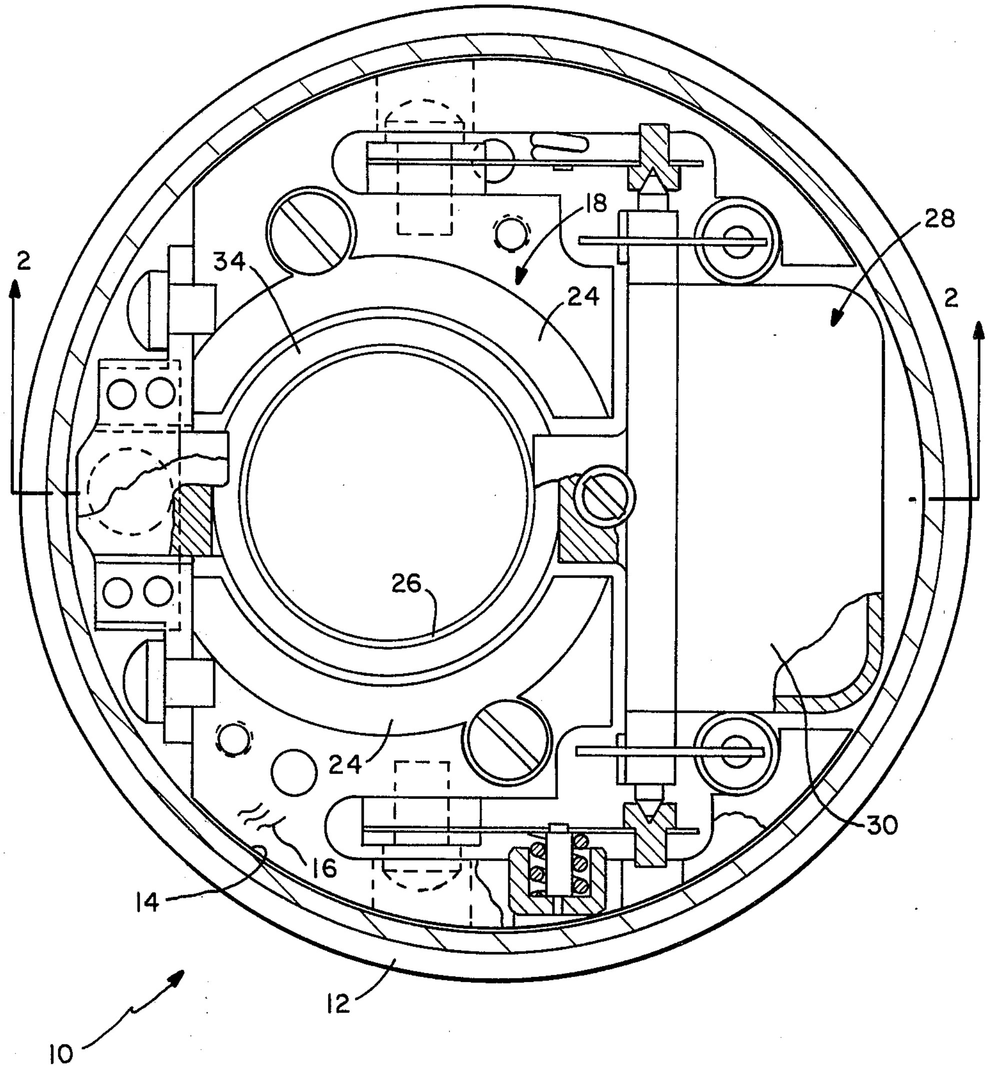
FIG. 1 illustrates one form of apparatus constructed in accordance with the invention.

With reference to FIG. 1, there is illustrated a probe, generally designated 2, to be applied to the flat surface of a sample or specimen of the material TS to be tested by measuring the velocity of an acoustic surface wave therethrough. The probe 2 includes a generator unit generally designated 4 for generating the acoustic surface wave in the test sample TS, and a detector unit generally designated 6 for detecting the generated acoustic surface wave in such manner that the travel time of the surface wave between two predetermined parallel lines can be accurately measured, thereby enabling the accurate determination of its velocity through the test sample TS.

More particularly, the generator unit 4 includes a generator transducer 10 coupled through a thin oil film to a plastic wedge 12 at the required angle, depending upon the material TS to be tested, such as to cause an acoustic wave generated by transducer 10 to impinge on the surface of the test sample at the critical angle required for the generation of an acoustic surface wave therealong. The plastic wedge 12 thus acts as a coupling device for coupling the generator transducer 10 to the surface of the test sample TS causing the acoustic wave to be generated therealong, at the required critical angle.

The detector unit 6 of probe 2 includes two pick-up transducers 20, 22, each coupled through a thin oil film to one of the pick-up coupling devices 24, 26 separated from each other by a predetermined distance "d" in the direction of travel of the acoustic surface wave along the test sample TS. Each of the pick-up coupling devices 24, 26 is of wedge-shape and is embedded within a body 28 such that their narrow ends **24*a*, 26*a* project slightly through the bottom of the body and are exposed for contact with the surface of the test sample TS. The tips 24*b*, 26*b* of the ends 24*a*, 26*a* are slightly rounded as will be more particularly described below. The wedges 24, 26 are embedded within body 28 such that the line contacts of the tips 24*b*, 26*b* with the test sample surface are spaced by the distances "d", and the longitudinal axes of the wedges are perpendicular to the plane of these line contacts. Each of the transducers 20, 22 is secured to the large end of its respective coupling wedge 24, 26**.

The generator transducer 10, as well as the pick-up transducers 20 and 22, are preferably of the piezoelectric type. Wedge 12 of the generator unit 4 is of plastic material, such as methyl methacrylate resin. Wedges 24 and 26 of the detector unit 6 are of solid, hardened steel; and the body 28 in which they are embedded is preferably of a mixture of plastic resin and particles having a large value of acoustic impedance per unit volume; an epoxy-resin matrix including tungsten particles has been found particularly useful. Unit 4 is provided with an oil film for coupling same to the test sample.

The system illustrated in FIG. 1 operates as follows:

The generator transducer 10 is pulsed from a high-voltage source of pulses 30 (e.g., −300 volts) such as to generate an acoustic wave which is coupled by the plastic wedge 12 to the surface of the test sample TS at the critical angle required for it to be refracted as an acoustic surface wave travelling through the test sample in the direction of the two steel wedges 24, 26. On reaching the contact plane of the closest steel wedge 24, namely, the line contact defined by its rounded tip **24*b*, the latter tip of the steel wedge 24 detects the shear component of the acoustic surface wave and generates a bulk wave which travels away from the plane of the contact surface (i.e., vertically upwardly in FIG. 1) to pick-up transducer 20, causing the transducer to generate an electronic signal. When the acoustic surface wave reaches the contact plane of the second steel wedge 26, namely its rounded tip 26*b*, the latter tip similarly detects the shear component of the acoustic wave and generates a bulk wave which travels to its transducer 22, causing it to generate a second electronic signal. Since the two steel wedges 24, 26 are of equal length and are subjected to the same environmental conditions (i.e., temperature), it will be seen that the time interval between the generation of the two electronic signals by the pick-up transducers 20, 22 is a measure of the travel time of the acoustic surface wave through distance "d", namely the distance between the two contact lines of the tips 24*b*, 26*b***. Since this distance is known, the measured travel time can be used for determining the velocity of the acoustic surface wave through the test sample TS.

By using the "critical angle" plastic wedge generator unit 4, a large amplitude, highly-damped acoustic surface wave may be generated; and by using, for the detector unit, the steel wedges 24, 26 embedded in a tungsten-epoxy-resin body, which has a large damping coefficient, unwanted partial-wave reflections may be substantially reduced or entirely eliminated in the steel wedges. This enables the steel wedges to output, to their respective transducers 20, 22, acoustic signals having a relatively high signal-to-noise ratio closely matching in form the original highly-damped acoustic waves generated by the generator unit.

The electronic signals generated by transducers 20 and 22 are fed via amplifier 32 to two channels of a microprocessing counter 34, which measures the elapsed time between the arrival of these two electronic signals. The signals from the transducers 20, 22 are also applied to two channels of a dual-trace storage oscilloscope 36, triggered from the high voltage pulse source 30, to provide a display of the electronic signals from the transducers 20, 22.

As indicated above, the narrow ends 24*a*, 26*a* of the two steel wedges 24, 26 are preferably rounded, rather than sharply edged. The radius of curvature of the rounded ends should be smaller than the wave-length of the acoustic surface wave generated in the test sample TS, but should be sufficiently large so as to pick up a significant amount of energy from the generated surface wave.

In one example, pulse source 30 generated fast rise-time high-voltage pulses at the rate of 5 kHz, each pulse having a wave-length of about 0.6 mm, in which case the ends 24*a*, 26*a* of the steel wedges were lapped to a radius of approximately 0.2 mm. The slanted sides of the two steel wedges 24, 26 were formed at an angle of 30°, and the wedges embedded in a tungsten-epoxy mixture containing 30 grams tungsten to every 100 grams epoxy resin, with the tips 24*b*, 26*b* spaced 1.1 cm (distance "d") and exposed 2 mm from the bottom face of the probe.

This system was used for testing aluminum alloys, in which case it was found that the measured elapsed time to traverse the distance "d" was in order of 3.8 μsec and was measured with a resolution of 0.1 nsec.

Figure 2:
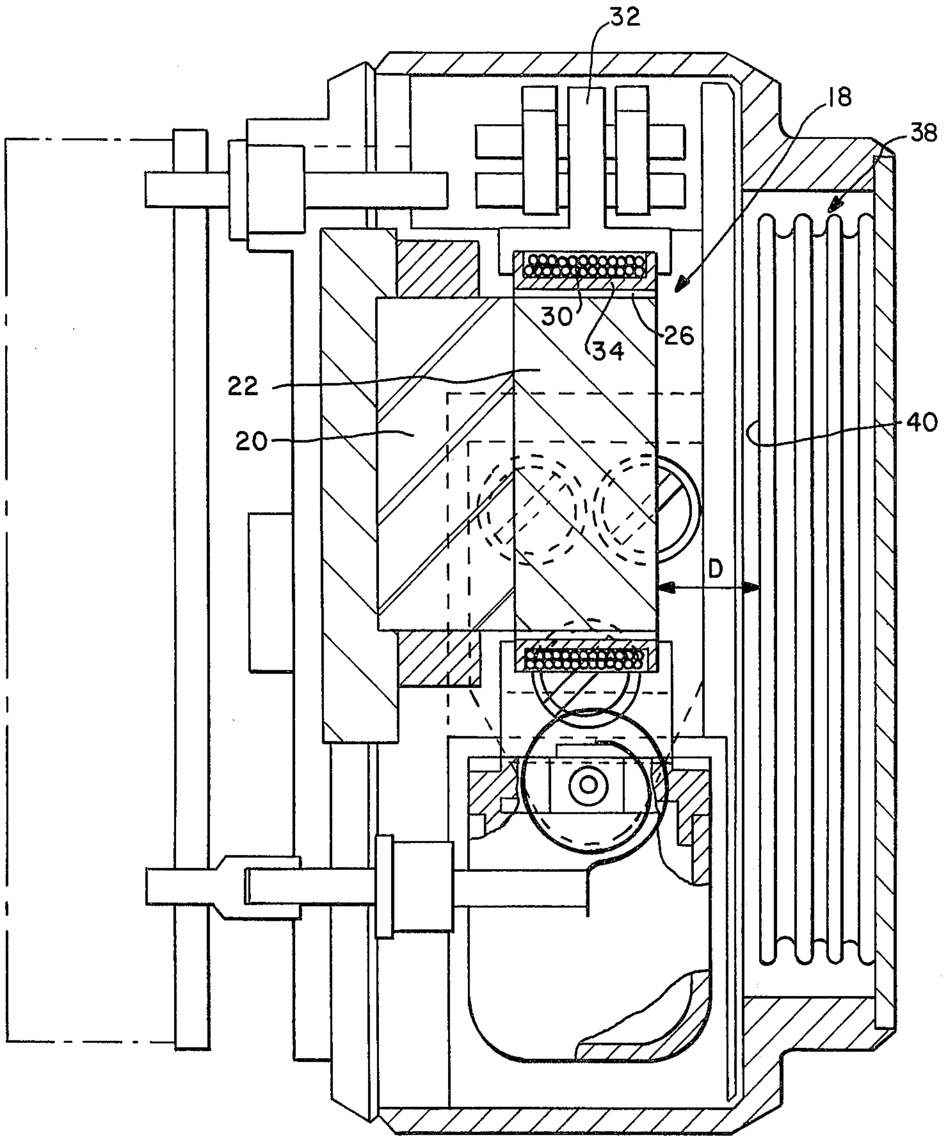
FIG. 2 is a three-dimensional view illustrating one form of probe constructed in accordance with the present invention for use with the apparatus of FIG. 1.

In this example, the body 28 of the detector portion 6 of the probe was cast with a transverse slot 40, as shown in FIG. 2, extending the complete height of the body 28 and serving as a socket for receiving the plastic wedge 12 of the generator unit 4. The latter unit was precisely located with respect to the pick-up unit 6, and particularly with respect to its two steel wedges 24, 26, by means of a light spring 42 (of tens of grams, e.g., 70 grams) urging the plastic wedge 12 against one wall of the socket 40. A similar light spring 44 urged the plastic wedge 12 against the surface of the test sample TS, and a further light spring 46, engaging a ball 48 fixed to the upper face of body 28, urged the detector unit 6 of the probe against the surface of the test sample TS.

The geometry of the detector portion 6 of the probe, particularly of the steel wedges 24, 26 coupling the pick-up transducers 20, 22 to the surface of the test sample TS, is the same for all materials, and therefore the same probe may be used for testing different materials by merely substituting the appropriate generator unit 4 according to the "critical angle" of the material being tested.

The probe illustrated in FIG. 2 was used to perform a plurality of tests on scratch-free aluminum 2024-T351 surfaces (in the condition as supplied by the manufacturer), in which tests a standard deviation of 1.0 to 1.5 nsec in travel time measurements was obtained. The total travel time was of the order of 3.8 μsec, and therefore the standard deviation of measurements constituted approximately 0.04% of the total travel time. Similar tests were made on plate-glass surfaces, wherein it was found that the standard deviation of travel time measurements was approximately 0.6 nsec on a total travel time of 3.4 μsec, or 0.02% of the total travel time.

Figure 3:
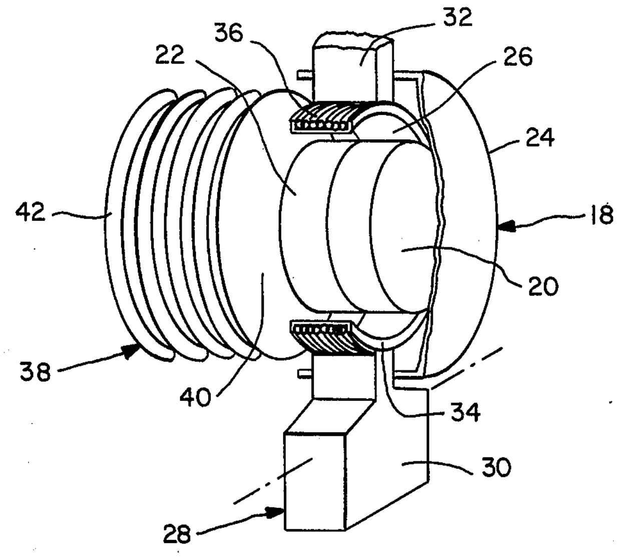
FIG. 3 is a three-dimensional view illustrating the detector portion of a second form of probe constructed in accordance with the invention for use in the apparatus of FIG. 1.
Figure 4A:
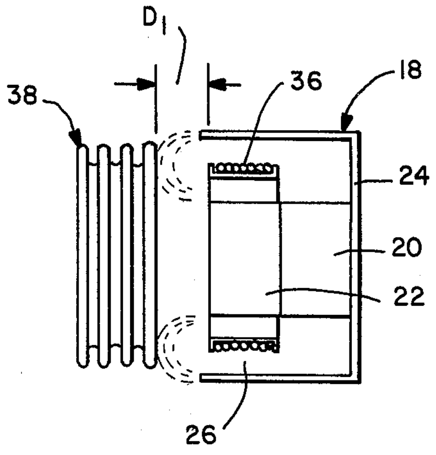
FIG. 4 is a three-dimensional view particularly illustrating the face of the detector unit in the probe of FIG. 3 adapted to contact the test sample.
Figure 4B:
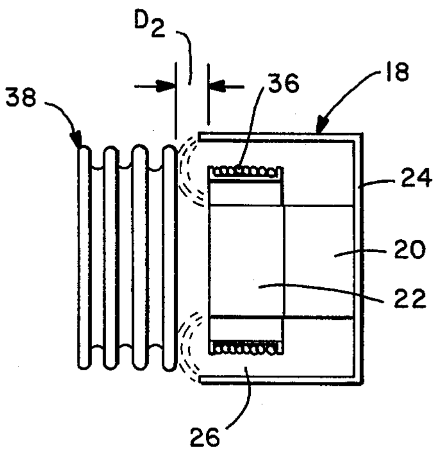
Figure 1:
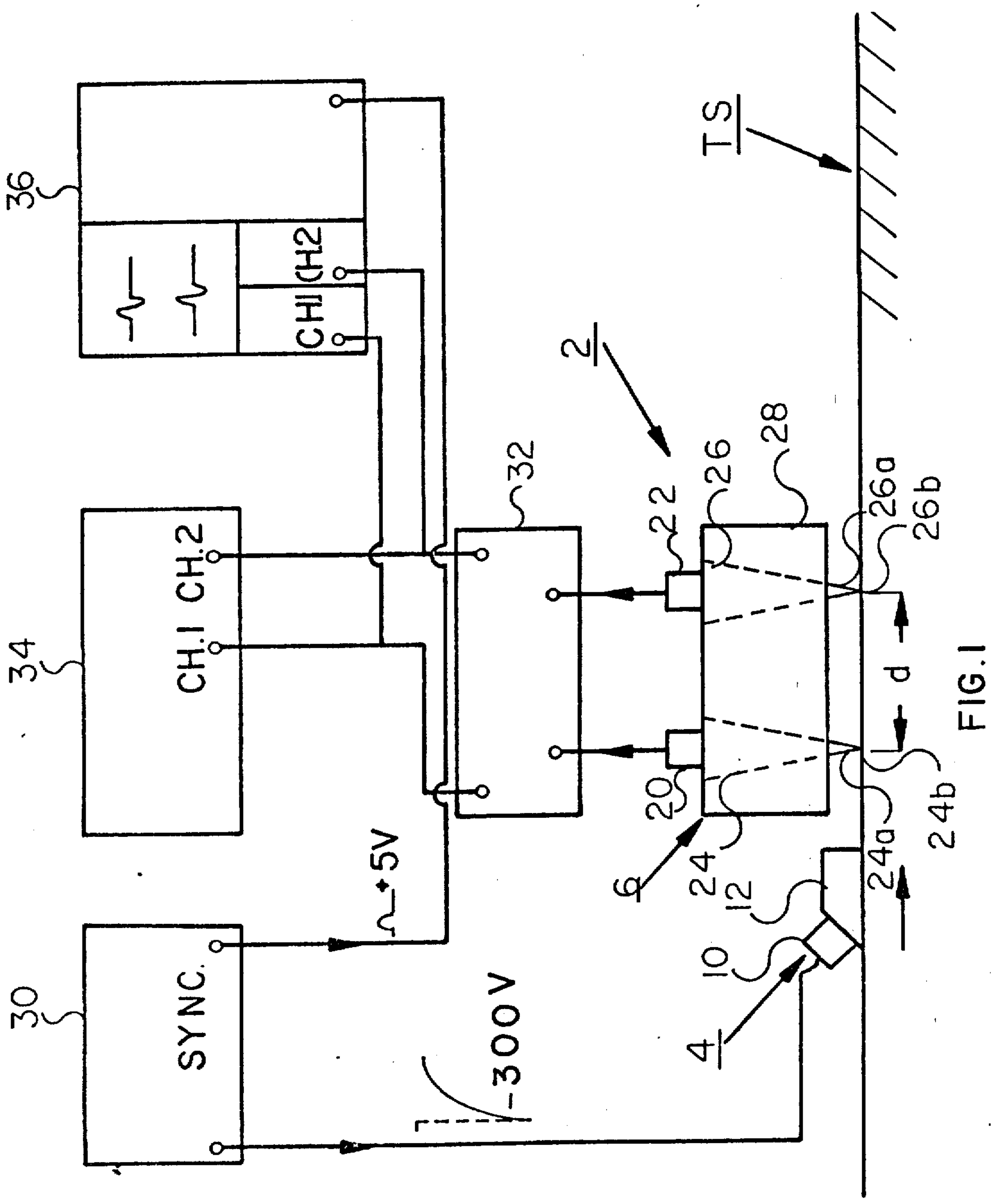
Figure 2:
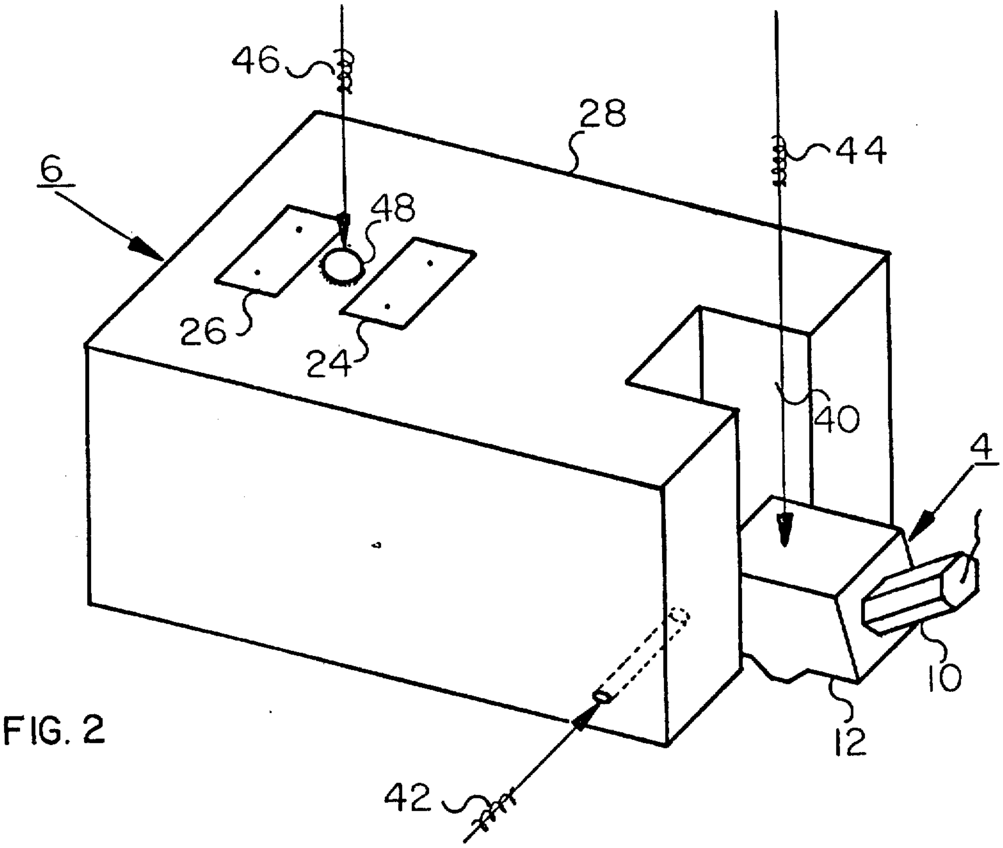
Figure 3:
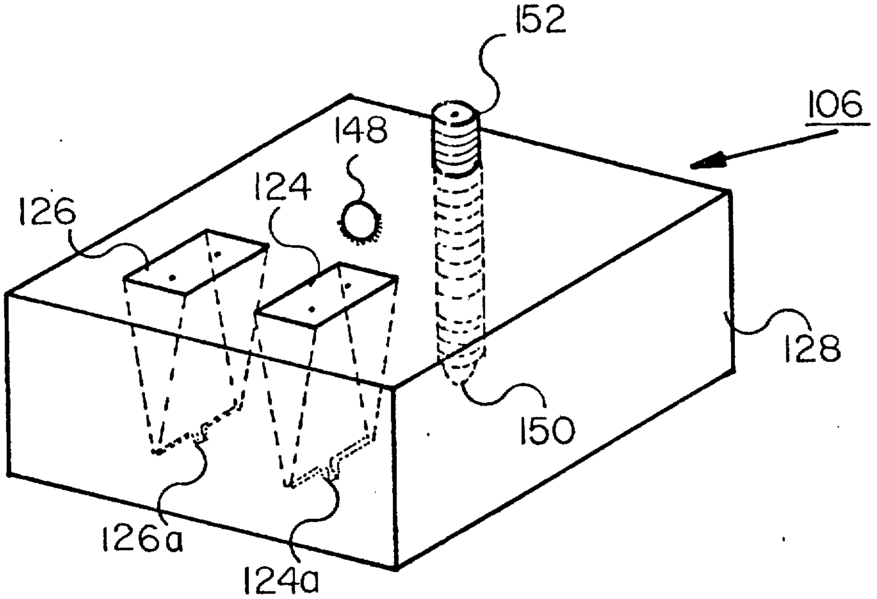
Figure 4:
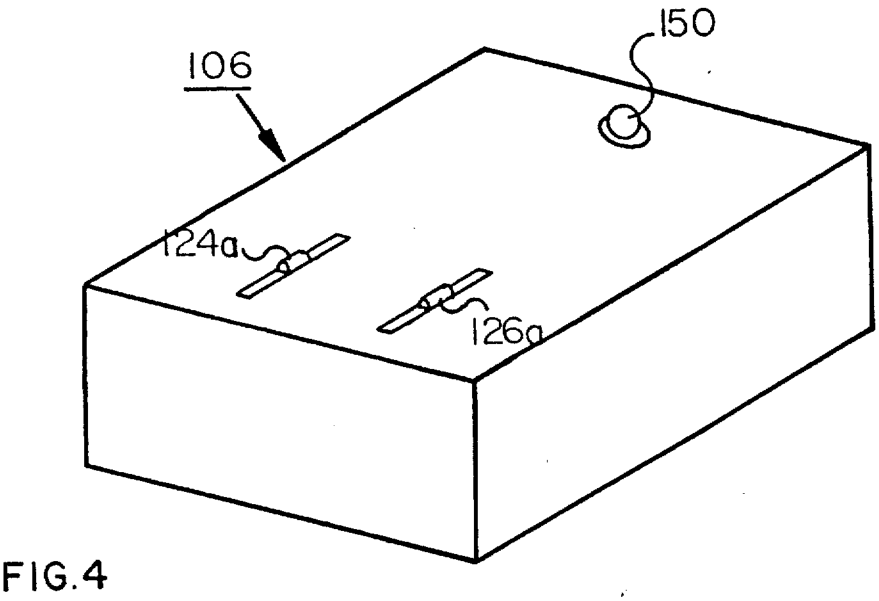
Figure 5:
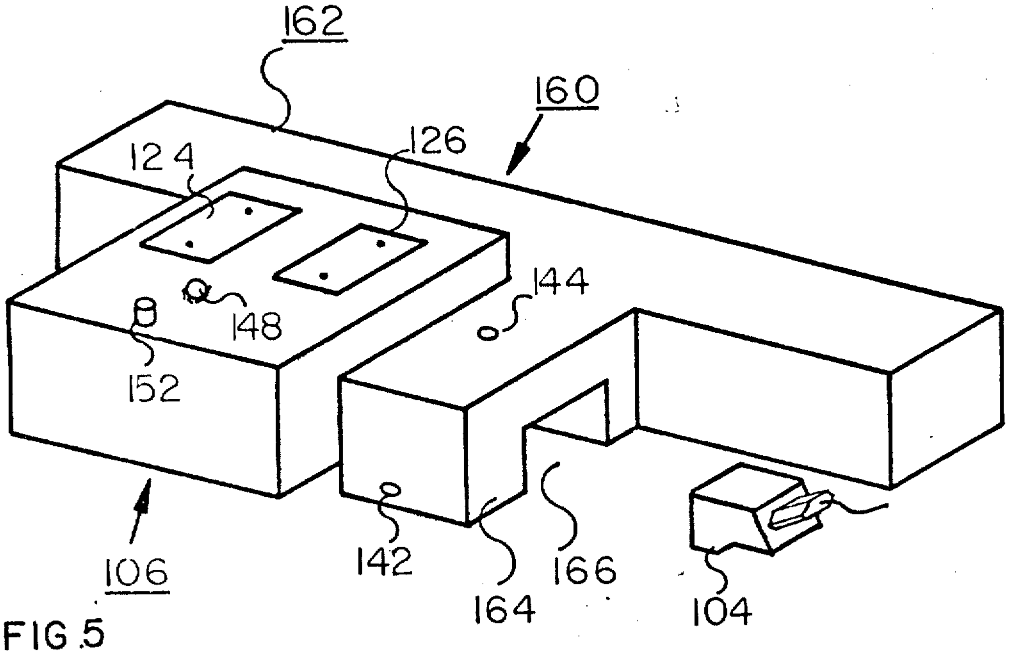
FIG. 5 is a three-dimensional view illustrating a complete probe including the detector unit of FIGS. 3 and 4, an aligning fixture, and a generator unit removably attached to it.

FIGS. 3–5 illustrate a construction which may be used to further improve the repeatability of the travel time measurements. This is particularly important, for example, in determining applied or residual biaxial surface stresses where high measurement resolution is a prerequisite. The embodiment illustrated in FIGS. 3–5 improves the repeatability of the travel time measurements mainly by increasing the stability of the probe, particularly by providing a stable three-member contact as described below.

Thus, with reference to FIGS. 3 and 4 which illustrate the opposite faces of the detector portion 106 of the probe, it will be seen that the two steel wedges 124, 126, respectively, have their narrow contact tips 124*b*, 126*b* reduced in length so as to provide short-line contacts with the test sample TS. For example, whereas in FIGS. 1 and 2 the line contacts provided by the wedge tips 24*b*, 26*b* were about 15 mm in length, the short-line contacts provided by wedge tips 124*b*, 126*b* in the construction of FIGS. 3 and 4 are reduced to about 0.5 mm.

Wedge ends 124*a*, 126*a* define two members of the stable three-member contact. The third member is defined by a ball 150 of 3 mm diameter bonded to the end of a long Allen screw 152 passing through the body 128 of the probe detector portion 106 laterally of, but midway between, the two wedges 124, 126. Screw 152 may be threaded through body 128 to adjust the position of the ball 150 with respect to the tips 124*b*, 126*b* of the steel wedges 124, 126, to obtain approximately equal amplitudes in the acoustic signals detected by the wedges.

The complete probe of this embodiment is illustrated in FIG. 5, including the detector unit 106 and the generator unit 104. In this embodiment, the probe further includes a plastic aligning fixture 160 of T-shaped configuration, including a long leg 162 and an intermediate leg 164 at right angles thereto. The detector unit 106 is received between the long leg 162 and one face of the intermediate leg 164, and may be urged against both of these faces by suitable springs so as to accurately locate this unit. The generator unit 104 is received within a slot 166 formed in the intermediate leg 164, and may be similarly urged against one face of the slot by another spring operating through a hole 142, e.g., as described in FIG. 2, to accurately locate the generator unit with respect to the detector wedges 124, 126. The detector unit 106 may be urged against the surface of the test sample by a further spring bearing against ball 148, and the generator unit 104 may similarly be urged against the surface of the test sample by another spring operating through hole 144, both as described above with respect to FIG. 2.

A probe was constructed according to the structure illustrated in FIGS. 3–5 wherein the steel wedges 124 and 126 were of a height of 20 mm and were spaced 11 mm between their center lines. Ball 150 was located exactly mid-way between the wedges and 20 mm laterally of the center line connecting them, and ball 148 was located on the centroid of a triangle defined by the three contact members 124*a*, 126*a* and 150. The wedge tips 124*b* and 126*b* were machined so as to be exactly parallel to each other and to lie exactly in the same plane (e.g., within about 10 microns). The construction and operation of the probe illustrated in FIGS. 3–5 were otherwise the same as described above with respect to FIGS. 1 and 2.

The above probe of FIGS. 3–5 was employed for the determination of repeatability of travel time measurements for surface waves on aluminum 2024-T351 alloy, and on plate-glass (soda lime glass) specimens. Five test specimens of the aluminum alloy were prepared with the approximate dimensions of 100×100×10 mm, in which one 100×100 mm surface of each specimen was mechanically finished with a different one of the following abrasive papers; No. 60 (rough), 240, 320, 400, and 600 (fine). A minimum of 50 repeated measurements were made at each of two measuring points of the prepared surface of each specimen. It was found that for the five specimens, each with a different surface finish, the test results were similar and showed a standard deviation of travel time varying from 0.3 to 0.5 nsec. Similar tests were conducted with respect to the plate-glass specimens, and similar results were obtained in which the standard deviation was even less, varying from 0.2 to 0.5 nsec.

The lower deviations of the travel time obtained by the use of the three-member probe of FIGS. 3–5 are due to its higher stability over the probe illustrated in FIGS. 1 and 2, and therefore this probe is better suited for measuring biaxial surface stresses, both in metal and in glass specimens. It is expected that the low standard deviations achieved with the three-member probe of FIGS. 3–5 will allow residual surface stresses, as well as externally applied stresses, to be measured with a high degree of accuracy in the order of 100 kg/cm$^2$.

Another advantage in the probe construction illustrated in FIGS. 3–5, as well as that illustrated in FIGS. 1 and 2, over the prior known devices, is that the new probe (both constructions) obviates the need of an oil coupling film between the wedge of the pick-up unit (6 or 106) and the test sample. Such an oil coupling film, used in previously-known devices, tends to produce errors and distortions in the detected signals because of variations in film thickness and also because of adhesion of the film to the sides of the wedge.

A further advantage over the prior known devices is that the new probe (both constructions) permits the use of a relatively light spring force, in the order of tens of grams, to couple the generator and detector units to the test sample. This is to be distinguished from the previously known probes wherein a large force, in the order of kilograms, was used, which large force tended to produce highly-stressed areas and deformation at the wedge tips, thereby particularly reducing the repeatability results.

While the invention has been described with respect to two preferred embodiments, it will be appreciated that many other variations, modifications and applications of the invention may be made.

What is claimed is:

1. The method of generating and detecting an acoustic surface wave particularly useful in the nondestructive testing of materials by measuring the velocity of an acoustic surface wave through a test sample, characterized in that:

(a) the acoustic surface wave is generated by a generator transducer coupled to the test sample such as to cause the generation of an acoustic surface wave therealong; and (b) the acoustic surface wave is detected by detector means including two pick-up transducers each coupled to the surface of the test sample by a coupling device having a narrow end in contact with the surface of the test sample and its longitudinal axis perpendicular thereto such that said narrow end detects the shear component of the acoustic surface wave and generates a bulk wave which travels longitudinally through the coupling device, away from its narrow end, to the pick-up transducer, the narrow ends of the two coupling devices contacting the surface of the test sample being spaced from each other a predetermined distance in the direction of travel of the acoustic surface wave therealong.

2. The method according to claim 1 wherein the width, in the direction of travel of the surface wave, of said narrow end of each pick-up coupling device in contact with the test sample surface is less than the wave-length of the acoustic surface wave propagated therealong.

3. The method according to claim 2, wherein the narrow end of each of said pick-up coupling devices provides a line contact with the surface of the test sample.

4. The method according to claim 2, wherein the narrow end of each of said pick-up coupling devices provides a short-line contact with the surface of the test sample.

5. The method according to claim 4, wherein the detector means comprises a third, stabilizing essentially pointcontact with the surface of the test sample.

6. The method according to claim 1, wherein each pick-up coupling device is a steel wedge having a rounded narrow end in contact with the surface of the test sample, and a large-area face at the opposite end coupled to the pick-up transducer.

7. The method of non-destructive testing of materials by measuring the velocity of an acoustic surface wave travelling through a test sample thereof, characterized in that the acoustic surface wave is generated and detected in the test sample in accordance with the method of claim 1.

8. Apparatus particularly useful for generating and detecting acoustic surface waves for the nondestructive testing of materials, comprising:

(a) generator means including a generator transducer, and a generator coupling device for coupling same to a test sample such as to cause the generation of an acoustic surface wave therealong; and (b) detector means including two pick-up transducers and two coupling devices, each coupling one of said transducers to the surface of the test sample, each of said pick-up coupling devices being disposed such as to have a narrow end exposed for contact with the test sample and its longitudinal axis perpendicular to said surface such that said narrow end is effective to detect the shear component of the acoustic surface wave and to generate a bulk wave which travels longitudinally through the coupling device, away from its narrow end, to the pick-up transducer, the narrow ends of the two coupling devices contacting the surface of the test sample being spaced from each other a predetermined distance in the direction of travel of the acoustic surface wave therealong.

9. Apparatus according to claim 8, wherein both of said coupling devices are of metal and are embedded in a body with their narrow ends exposed for contact with the surface of the test sample.

10. Apparatus according to claim 9, wherein said body is a mixture of plastic resin and particles having a large value of acoustic impedance per unit volume.

11. Apparatus according to claim 10, wherein said body is a mixture of an epoxy-resin and tungsten particles.

12. Apparatus according to claim 9, wherein said coupling devices are of steel.

13. Apparatus according to claim 8, wherein the width, in the direction of travel of the surface wave, of said narrow end of each of the pick-up coupling devices to contact the test sample is less than the wave-length of the acoustic surface wave propagated therealong.

14. Apparatus according to claim 8, wherein each of said coupling devices is wedge-shaped and provides a relatively long line contact with the surface of the test sample.

15. Apparatus according to claim 8, wherein each of said coupling devices is wedge-shaped and provides a short-line contact with the surface of the test sample.

16. Apparatus according to claim 15, wherein the detector means includes a third, stabilizing point contact with the surface of the test sample.

17. Apparatus according to claim 8, wherein each pick-up coupling device is a steel wedge having a rounded narrow end in contact with the surface of the test sample, and a large-area face at the opposite end coupled to the pick-up transducer.

18. Apparatus according to claim 8, wherein the generator transducer and its coupling device are both included in a generator unit removably attached to a detector unit including the pick-up transducers and coupling devices, to enable the selective attachment of different generator units designed for testing samples having different critical angles.

19. Apparatus according to claim 18, wherein the detector unit includes a cast body embedding said pick-up coupling devices, said generator unit being removably received in a socket formed in said cast body.

20. Apparatus according to claim 18, further including an aligning fixture having a first socket for precisely locating said detector unit and a second socket for precisely locating said generator unit.

21. Apparatus for the non-destructive testing of material by measuring the velocity of an acoustic surface wave therethrough, comprising a probe including generator means and detector means according to claim 8 for generating an acoustic surface wave through a test sample and for detecting same at two spaced predetermined points therein, and an electronic system for measuring the time interval between the detection of the acoustic surface wave at said two predetermined points thereof.

* * * * *

UNITED STATES PATENT AND TRADEMARK OFFICE
CERTIFICATE OF CORRECTION

PATENT NO. : 4,338,820

DATED : July 13, 1982

INVENTOR(S) : Kenneth Jassby and Aharon Zeiger

It is certified that error appears in the above-identified patent and that said Letters Patent is hereby corrected as shown below:

The three sheets of drawings consisting of Figures 1, 2, 3, 4A and 4B should be substituted with the three sheets of drawings as per attached.

The title page should appear as shown on per attached sheet.

Signed and Sealed this

*Twenty-second* Day of *February 1983*

[SEAL]

*Attest:*

GERALD J. MOSSINGHOFF

*Attesting Officer* *Commissioner of Patents and Trademarks*

Patent No. 4,338,820

United States Patent [19]

Jassby et al.

[11] 4,338,820

[45] Jul. 13, 1982

[54] METHOD AND APPARATUS FOR GENERATING AND DETECTING ACOUSTIC SURFACE WAVES PARTICULARLY USEFUL IN THE NON-DESTRUCTIVE TESTING OF MATERIALS

[75] Inventors: Kenneth Jassby; Aaron Zeiger, both of Herzlia, Israel

[73] Assignee: Ramot University Authority for Applied Research & Industrial Development, Tel Aviv, Israel

[21] Appl. No.: 190,616

[22] Filed: Sep. 25, 1980

[51] Int. Cl.[3] .......... G01N 29/00

[52] U.S. Cl. .......... 73/597; 73/644; 310/313 R

[58] Field of Search .......... 73/597, 598, 644, 599, 73/600; 310/313 R

[56] References Cited

U.S. PATENT DOCUMENTS

| | | | |
|---|---|---|---|
| 3,340,953 | 9/1967 | Zemanek, Jr. | 73/597 X |
| 3,580,057 | 5/1971 | Seegmiller | 73/597 |
| 4,059,989 | 11/1977 | Halsey | 73/598 |

FOREIGN PATENT DOCUMENTS

| | | | |
|---|---|---|---|
| 538285 | 1/1977 | U.S.S.R. | 73/599 |

OTHER PUBLICATIONS

Gordon, Jr.–Measurement of Applied and Residual Stresses Using an Ultrasonic Instrumentation System-ISA Transactions, vol. 19, No. 2, 1980, pp. 33–41.

*Primary Examiner*—Charles A. Ruehl
*Attorney, Agent, or Firm*—Benjamin J. Barish

[57] ABSTRACT

A method and apparatus for generating and detecting acoustic surface waves particularly useful in the non-destructive testing of materials. In this method, the acoustic surface wave is generated in the test sample by a generator transducer coupled to the test sample so as to cause the acoustic wave to impinge on it at the required critical angle. The acoustic surface wave is detected by a pair of spaced steel wedges having their narrow ends in contact with the surface of the test sample so as to detect the shear component of the acoustic surface wave and to generate bulk waves in the steel wedges which travel away from the plane of the contact surface to pick-up transducers. In one described embodiment, the steel wedges provide two spaced, rounded-surface, long-line contacts with the test sample; and in a second described embodiment, a three-member contact is provided in which two of the members are defined by rounded-surface short-line contacts of the wedges, and a third, stabilizing contact is provided by a ball.

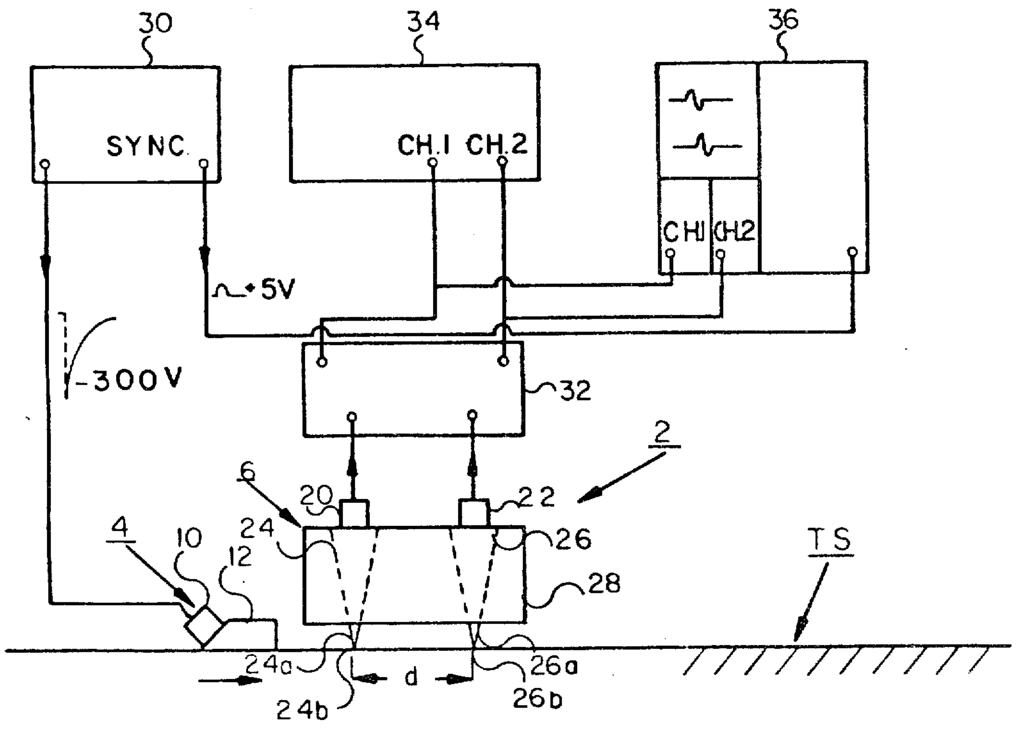

21 Claims, 5 Drawing Figures